Sept. 1, 1931. S. WADSTEN 1,821,249
WIRE BENDING DIE
Filed June 11, 1929

INVENTOR
S. WADSTEN
BY
ATTORNEY

Patented Sept. 1, 1931

1,821,249

UNITED STATES PATENT OFFICE

STEN WADSTEN, OF BLOOMFIELD, NEW JERSEY, ASSIGNOR TO WESTINGHOUSE LAMP COMPANY, A CORPORATION OF PENNSYLVANIA

WIRE-BENDING DIE

Application filed June 11, 1929. Serial No. 369,970.

This invention relates to the manufacture of helically coiled wire for the production of lamp filaments, and relates more particularly to a bending element or die employed for the winding of filamentary wire.

Lamp filaments, consisting of a helically coiled wire, are formed either by winding a filament wire about a mandrel and subsequently removing the mandrel, or by winding a wire through the agency of a coil-forming die such as that shown in Patent 1,670,499 granted May 22, 1928 to John W. Ekstedt, which discloses what is known as a mandrelless coil-winding machine. This machine employs a coil-winding element or die provided with a cavity adjacent to a lip for spacing the turns of a helix which is formed by directing a wire into the cavity and causing it to issue in a series of turns which pass over the said lip.

The present invention relates to a die such as employed in the above-mentioned mandrelless coil-winding machine and it is an object of the present invention to provide a coil-winding die in a more accurate, expeditious and convenient manner.

Another object of this invention is to provide a coil-winding die in which a cavity may be formed of a predetermined depth while the lip employed for spacing the turns of the coil is free from irregularities.

Another object of the invention is to provide a method for forming a cavity and lip within an area measuring .008 by .006 of an inch.

Other objects and advantages of the invention will be evident from the following description.

In the manufacture of coil-winding dies for producing fine helically wound filaments it has been the practice to form the coil-winding cavity in a diamond block.

The operation of forming the cavity comprises grinding the cavity by means of what is termed a lapping wheel. The diamond block is provided with a flat surface and the lapping wheel, while rotated at a high speed, is brought into contact with the surfaces and a cavity is ground. The lapping wheel is of substantially the same diameter as the cavity required and the depth of the cavity has heretofore been limited by the diameter of the portion of the spindle of the lapping wheel adjacent to the side of the wheel.

As the cavity is ground the spindle of the lapping wheel approaches the surface of the block and on account of the contact between the lapping wheel and the edge of the block it has been difficult to obtain a die cavity having a depth greater than approximately 25 per cent of the coil diameter. In dies as heretofore produced, when the lapping wheel reached this depth, the spindle contacted with the edge of the block adjacent to the groove which edge constituted the spacing lip. Portions of the lip were broken away making the lip uneven and detrimental to the winding of accurately spaced helical coils.

It will be understood that when providing a lapping wheel the attached spindle must be relatively large in diameter at a point adjacent to the lapping wheel in order to maintain the required strength during the lapping operation. If the spindle is reduced in diameter to such a degree that the lapping wheel may reach the required depth in a cavity without the spindle contacting with the surface of the block, the spindle will not have the proper strength and in practice will not stand up for the performance of the lapping operation.

The present invention provides a method of grinding whereby a lapping wheel may be provided with a relatively heavy spindle and operated to cut a groove to the required depth or to a depth greater than 25 per cent of the coil diameter.

The invention will be more fully understood by reference to the accompanying drawings in which Fig. 1 is a perspective view of a die block or shank ready to have a coil-winding groove formed therein.

Figure 1:
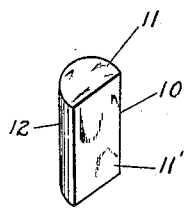
Figure 2:
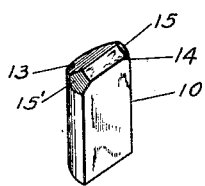
Fig. 2 is a perspective view of the block shown in Fig. 1 but having portions beveled to prepare the block for the grinding operation.
Figure 3:
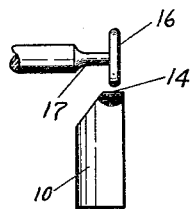
Fig. 3 is a side view of the block shown in Fig. 2 and shows a lapping wheel in position ready to be moved into contact with the block for the formation of a die cavity.
Figure 4:
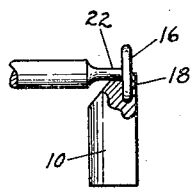
Fig. 4 is a side view of the diamond block partly in section with the lapping wheel in the cavity.
Figure 5:
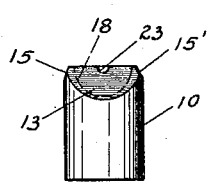
Fig. 5 is a view looking in the direction of the beveled surface of the die block, the cavity being indicated in dotted lines.
Figure 6:
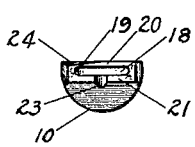
Fig. 6 is a plan view of the block shown in Fig. 5.
Figure 7:
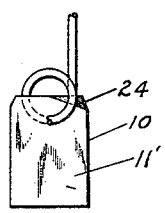
Fig. 7 is a side view of the die block showing a wire entering and emerging from the cavity.
Figure 8:
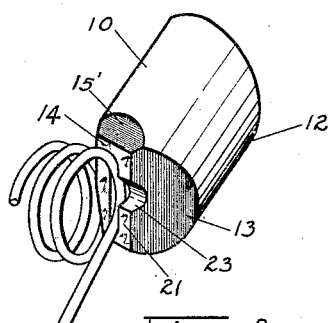
Fig. 8 is a perspective view of a die constructed in accordance with the present invention and illustrating the formation of a series of helical turns of wire.

When practicing the present invention a die block or body 10 having a flat surface 11 and a rounded surface 12 may be provided. This block may be of any suitable hard, wear-resisting material and it has been found preferable to employ a diamond. The block 10 is then provided with a beveled surface 13. Opposite ends 15 and 15' of the face 11 may be beveled to provide inclined surfaces leaving a surface or face 14 in the form of a parallelogram. The block 10 may then be supported and a lapping wheel 16 having a spindle 17 may be rotated at high speed by any suitable means and moved into contact with the face 14.

The operation of lapping the diamond die is the same as practiced heretofore, the lapping wheel being charged in the usual manner with diamond dust. It will be understood that during the operation necessary for producing a cavity of the required depth a number of lapping wheels may be employed since owing to the hardness of the material the lapping wheels wear down at a rapid rate and must be renewed from time to time. After the lapping wheel 16 has ground away sufficient material a cavity 18 results, this cavity being substantially the same diameter as the diameter of the lapping wheel and having a rounded bottom portion 19 which is preferably the same diameter as the diameter of the wire to be wound in the die. The formation of the cavity insofar as its dimensions are concerned is of course determined by the dimensions of the lapping wheel which may be varied according to the size of the wire to be wound.

The lapping wheel 16 is so positioned that the cavity 18 is formed adjacent to one side of the surface 14 of the block so as to leave a side wall or lip 20 while the opposite side 21 of the cavity is ground away by the shank portion 22 of the spindle 17 of the lapping wheel which forms a notch or groove 23 thus permitting the wheel to reach the required depth in the block and form the cavity 18.

The contacting surface of the spindle may be charged with diamond dust to facilitate the formation of the notch. In practice it has been found that when charging the wheel 16 sufficient abrasive material falls on the effective portion of the spindle to effect a grinding operation.

A coil winding die produced in accordance with the present invention is comprised of a slot or cavity between two oppositely disposed and relatively thin walls.

One of the walls serves as a lip or separator member to separate the turns of the issuing coils. The opposite wall is provided with the notch to receive the spindle of the lapping wheel. It will be evident that a die of this construction may be readily reground after use. For example if the die has been in operation and lost the desired form a lapping wheel may be applied and more easily centered by reason of the notch which serves as an adjuster or guide to locate the wheel for a grinding operation.

By reason of the present method the lip 20 is left with an even smooth surface free from rupture as had heretofore been caused by contact with the shank 22 of the lapping wheel, since in the manufacture of coil-winding dies it had previously been the custom to grind the cavity with the shank of the lapping wheel extending over the lip 20.

For the purpose of aiding the coil-winding operation and permitting the wire to issue from the die more readily the lip 20 may be provided with an attenuated portion 24 by grinding away the surface of the lip thus permitting the turns of wire to more readily issue from the die.

The present invention makes it possible to wind a helical filament of extremely small diameter, as for example for a 10 watt lamp as well as for lamps having larger diameter coils. The present method also makes it practical to use a lapping wheel having a sufficiently strong spindle which may be operated to grind a cavity of greater depth than was heretofore possible, and inasmuch as the lapping operation in no way mutilates or changes the desired even surface of the coil-winding lip a more accurate and efficient coil-winding element is obtained.

Although a preferred embodiment of the invention is shown and described herein, it is to be understood that modifications may be made therein without departing from the spirit and scope of the invention as set forth in the following claims.

What is claimed is:

1. A coil-winding die comprising a body having a flat face bounded on one side by an inclined surface, a cavity formed adjacent to the opposite side to provide a lip, and a notch opposite to the lip to receive the shank of a grinding tool during the formation of said cavity.

2. A coil-winding die comprising a body having a flat face bounded on one side by an inclined surface, a cavity formed adjacent to the opposite side to provide a lip, and a notch connecting said inclined surface with said cavity.

3. A coil-winding die comprising a body having a faced portion, a cavity formed in said portion and adjacent to one side thereof to provide a lip, and a notch at the opposite side of said portion.

4. A coil-winding die comprising a body having a flat face, a cavity formed in said face, the mouth of said cavity being enclosed in part by oppositely disposed walls, one of said walls constituting a separator lip and the opposite wall having a recessed portion.

5. A coil-winding die comprising a body having a flat face, a cavity formed in said face, the mouth of said cavity being enclosed in part by oppositely disposed walls, one of said walls constituting a separator lip and the opposite wall having a notch disposed transverse thereto.

In testimony whereof, I have hereunto subscribed my name this 8th day of June, 1929.

STEN WADSTEN.